United States Patent [19]

Reese

[11] Patent Number: 5,583,796
[45] Date of Patent: Dec. 10, 1996

[54] VIDEO SECURITY BACKUP SYSTEM

[75] Inventor: Daniel J. Reese, Columbia, Pa.

[73] Assignee: Philips Electronics North America Corporation, New York, N.Y.

[21] Appl. No.: 466,386

[22] Filed: Jun. 6, 1995

[51] Int. Cl.$^6$ ...................................................... G06F 9/00
[52] U.S. Cl. ................. 364/550; 364/514 A; 364/514 C; 364/525
[58] Field of Search ............................... 364/550, 514 A, 364/514 C, 525; 340/825.7, 825.79, 825.8, 825.32, 825.16; 348/143, 148–156, 159, 705, 706, 722, 211–213, 512, 516, 518, 347, 367, 368

[56] References Cited

U.S. PATENT DOCUMENTS

| | | | |
|---|---|---|---|
| 5,264,929 | 11/1993 | Yamaguchi | 348/159 |
| 5,287,186 | 2/1994 | Takamori | 348/705 |
| 5,365,511 | 11/1994 | Kusano | 340/825.79 |
| 5,420,856 | 5/1995 | Kerns | 370/58.1 |

Primary Examiner—Ellis B. Ramirez
Assistant Examiner—Hal P. Wachsman

[57] ABSTRACT

A video security surveillance system comprises a backup video switching control unit connected in tandem with a primary video switching control unit. A backup controller monitors operation of the primary switching control unit and automatically effects transfer of control of the video security system to the backup switching control unit upon detection of a failure condition of the primary switching control unit. During normal operation, the backup switching control unit is continuously updated with the same configuration parameters as the primary switching control unit so that in the event of a failure condition requiring a transfer to the backup switching control unit, the transfer of control is effected wherein the backup switching control unit operates in accordance with the same configuration data as the primary switching control unit prior to the failure condition.

20 Claims, 4 Drawing Sheets

VIDEO SECURITY BACKUP SYSTEM

FIELD OF THE INVENTION

The present invention relates to a video security system and, in particular to a video security system having redundant video matrix switching control units and a backup control system for ensuring that data within a backup video matrix switching control unit is identical to that stored in a main video matrix switching control unit. The backup control system also effects transfer of control of the video security system to the backup switching control unit when a failure of the main unit is detected.

BACKGROUND OF THE INVENTION

Video security systems are widely employed in facilities where it is desirable to monitor events at a number of locations within the facility. Such security systems typically include a video matrix switching apparatus which connects signals from a plurality of cameras to one or more video monitors so that an operator at a single location can view activity in any of the monitored locations. Typically, operation of the video matrix switching apparatus is controlled in accordance with a program stored within a switching control unit. Such a switching control unit may be co-located with the matrix switching apparatus or, alternatively, the switching control unit may be at a remote location from the switching apparatus. It is often desirable to provide redundancy in such security systems such as by installing multiple cameras at each monitored location so that a failure of one camera does not result in a loss of the ability to observe that location. A security system provided with redundant peripheral equipment, such as cameras, monitors, and the like, is still vulnerable to a total loss of ability to observe any of the monitored locations if the video matrix switching apparatus or its associated controller fails. It would be desirable to and is accordingly an object of the present invention have a video security system wherein a backup video matrix switching apparatus or a backup switching controller is automatically substituted for a main video matrix switching apparatus or main switching controller, respectively, in the event of a failure. Ideally, the backup switching apparatus would be substantially similar to the main unit in structure and function so that a transfer of operation between the main and the backup units occurs in a manner that is transparent to the operator. Additionally, it would be desirable and is accordingly an object of the present invention to have a backup control system that does not depend on any specialized backup control features of the main unit, so that a previously installed video security system could be equipped with backup capability without having to re-program or to replace the existing video matrix switching apparatus or its associated switching controller.

Video switching systems are known which are capable of providing complex remote monitoring features in accordance with configuration data maintained within the memory of the switching controller. Configuration data such as switching sequences, video captions, alarm response routines, and the like, can be specified and/or altered during operation of the video security system. In order to provide transparent transfer of control from such a switching control system to a backup switching control system, it would be desirable and is accordingly an object of the present invention to specify and/or alter similar configuration data within the memory of the backup switching control system so that, at the time control is transferred, the backup switching control system operates in accordance with the same configuration data used by the main switching control system just prior to the transfer.

SUMMARY OF THE INVENTION

In accordance with one aspect of the present invention, a video security system is provided having at least one video monitor connected to receive a video signal and for displaying a video image represented by the video signal; a plurality of cameras each disposed at a location remote from the video monitor for producing a video signal representing an image of the respective remote location; a first video switching unit connected for receiving the video signal from each of the plurality of cameras and for providing the video signal to the video monitor; and a first switching control unit for receiving configuration data and for providing switching control signals to the first switching unit in accordance with the switching control signals. The video security system according to this invention also includes a second switching control unit for receiving the configuration data and for providing switching control signals to a second video switching unit. The second video switching unit has a video output terminal and is operable to provide the video signal to the output terminal in accordance with the switching control signals received from the second switching control unit. A configuration selector generates the configuration data and is connected for transmitting the configuration data to the first switching control unit. A backup controller connected with the configuration selector monitors the configuration data transmitted to the first switching control unit and provides a duplicate of said configuration data to the second switching control unit. The backup controller includes a detection means for detecting a failure condition of the first switching control unit and produces a transfer control signal in response thereto. A transfer mechanism is connected to receive the transfer control signal and, in response thereto, disconnects the video monitor from the first video switching unit, connects the video monitor to the output terminal of the second video switching unit, and transfers control of the video security system to the backup switching control unit.

In an alternative embodiment of the present invention, a video security system is provided having at least one video monitor connected to receive a video signal and for displaying a video image represented by the video signal; a plurality of cameras each disposed at a location remote from the video monitor for producing a video signal representing an image of the respective remote location; a first switching control unit for receiving configuration data and for providing switching control signals; and a video switching unit connected for (i) receiving the video signal from each of the plurality of cameras, (ii) receiving the switching control signals, and (iii) providing the video signal to the video monitor in accordance with the switching control signals. The video security system according to this invention also includes a second switching control unit connected for receiving the configuration data. A configuration selector generates the configuration data and is connected for transmitting the configuration data to the video switching control unit. A backup controller, connected with the configuration selector, monitors the configuration data transmitted to the first switching control unit and provides a duplicate of said configuration data to the second switching control unit. The backup controller includes a detection means for detecting a failure condition of the first switching control unit and produces a transfer control signal in response thereto. A transfer mechanism is connected to receive the transfer control signal and, in response thereto, disconnects the video switching unit from the first switching control unit and then connects it with the second switching control unit, thereby transferring control of the video security system to the second switching control unit when a failure of the first switching control unit is detected.

According to another aspect of the present invention, a backup controller for a video security system is adapted for duplicating configuration data provided to a main switching control unit and for transmitting the duplicated data to a backup switching control unit during operation of the video security system. Thus, the backup controller ensures that configuration data maintained in the memory of the backup switching control unit is essentially the same as that maintained in the main switching control unit. In the course of monitoring communications made to the main switching control unit from any peripheral equipment capable of altering the configuration data, the backup controller also monitors the response of the main switching control unit to such communications in order to detect any failure of the main switching control unit to properly respond. Upon detection of a failure of the main switching control unit to respond, the backup controller transfers control of the video security system to the backup switching control unit.

BRIEF DESCRIPTION OF THE DRAWINGS

The foregoing summary as well as the following detailed description of the preferred embodiments of the present invention will be better understood when read in conjunction with the appended drawings, in which.

DETAILED DESCRIPTION OF THE PREFERRED EMBODIMENTS

Figure 1:
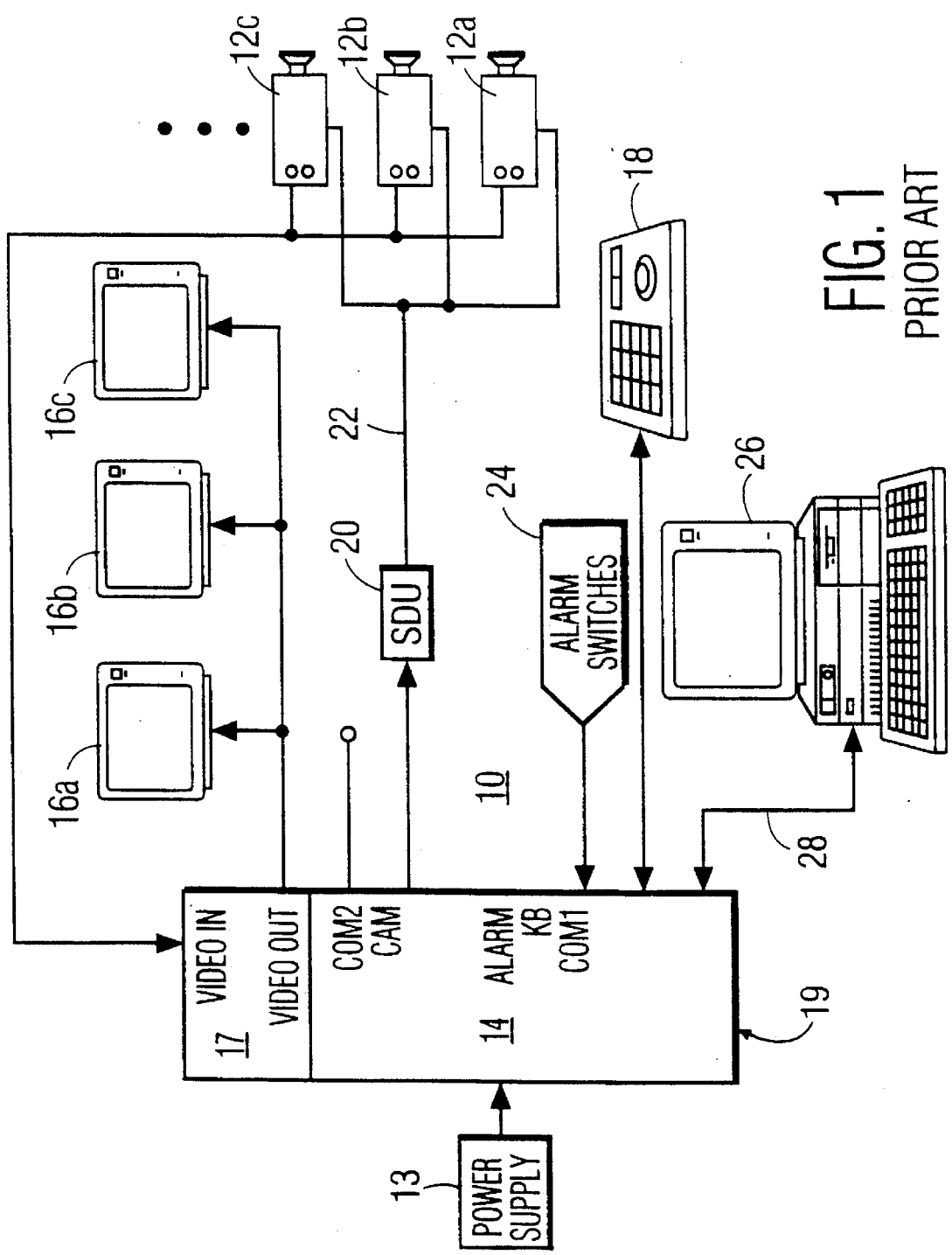
FIG. 1 is a diagram of a known video security system.

Referring now to FIG. 1, there is shown a known surveillance system 10. The surveillance system 10 includes one or more video cameras, 12a, 12b, and 12c that are each at a remote location to be monitored. Each of the video cameras produces a video signal that is transmitted to an input terminal, designated VIDEO IN, of a centrally located video matrix switching unit 17.

The VIDEO IN terminal of the switching unit 17 includes a plurality of coaxial connectors for receiving video signals from the cameras 12a–c. Other sources of video signals, such as video outputs from other switching units, may be connected to the VIDEO IN terminal of the switching unit 17. The switching unit 17 also has a VIDEO OUT terminal which preferably includes a plurality of connectors for attaching one or more monitors 16a–c to the switching unit 17. The switching unit 17 is operative to provide any of the VIDEO IN signals to any of the monitors 16a–c in response to switching control signals provided by a switching control unit 14.

The switching control unit 14 executes a sequencing program that controls the connections made by the switching unit 17 between input video signals and the video output terminals, VIDEO OUT, so that any or all of the monitors 16a–c will display a selected image or sequence of images corresponding to selected video input signals.

The switching unit 17 and the switching control unit 14 are housed within an enclosure 19, such as a "card cage" or equipment rack, providing a communication bus (not shown) there in for transmitting switching control signals from the switching control unit 14 to the switching unit 17. Electrical power is provided to the switching unit 17 and the switching control unit 14 from a power supply 13. Such combined switcher/controller systems are commercially-available as the TC8X00 family of microprocessor-based matrix switcher/controller systems manufactured by Burle Industries, Inc. of Lancaster, Pa.

The sequence by which input video signals are connected to the video output terminals is determined according to configuration data stored in a memory within the switching control unit 14. The configuration data includes sequence parameters that define one or more switching sequences. The switching control unit 14 is adapted for storing several different sets of sequence parameters that can be retrieved from the memory and utilized selectively, in accordance with prevailing circumstances, to cause a desired sequence of images to be displayed upon any of the monitors 16a–c. The switching control unit 14 preferably includes an auxiliary communication terminal, COM2, to permit communication with additional peripheral equipment or with a remote switching unit or units. The switching unit 17 is also equipped to provide video output signals to video recording equipment or to another switching unit or units in a distributed video surveillance network.

The switching control unit 14 includes a keyboard terminal KB, to which a keyboard 18 is connected. The keyboard 18 includes a plurality of keys, a display, and a joystick. By "keying in" parameters, the system operator provides control information to the switching control unit 14 in response to prompts shown on the keyboard display. For example, the operator can specify the sequence parameters according to which the video input signals will be connected to the video output terminals of the switching unit 17.

The keyboard is provided with a joystick or similar device so that the user can pan and/or tilt a camera. Such a camera control arrangement is described in greater detail in commonly owned, copending application Ser. No. 08/263,782, now U.S. Pat. No. 5,517,236. Briefly, camera control commands are entered by the user through the keyboard 18. The switching control unit 14 interprets the entered commands or joystick movements and then issues a camera control signal, via the CAM terminal, to a signal distribution unit (SDU) 20. The signal distribution unit 20 then broadcasts the control signal to the cameras 12a–c via a camera control signal distribution network 22. The cameras are operative to receive control signals from the SDU 20 and to respond by adjusting their position, focus, zoom, exposure, or other parameter as specified by the user.

In an alternative embodiment, two or more keyboards are connected to the switching control unit 14. For example, each of several keyboards may be associated with one of several clusters of monitors so that multiple users may each select the video signals to be displayed upon their respectively assigned cluster of monitors. In such an embodiment, it is desirable to define, for each user, a subset of the configuration data that each user is permitted to alter.

Various permission arrangements can be defined by a designated master user in the form of a user access table that is stored in the memory of the switching control unit 14. The user access table is employed by the switching control unit 14 to determine such information as which cameras, monitors, and/or sequences each user is permitted to use. Additionally, each user is assigned a unique identification code and/or password which must be entered whenever the user begins a surveillance session.

In-order to actively alert a user to a potentially important event, the surveillance system 10 includes a plurality of alarm switches 24 that are connected with the ALARM terminal of the switching control unit 14. Such alarm switches include, for example, intrusion detection devices in areas monitored by the cameras 12*a*–*c*. Whenever the switching control unit 14 detects activation of one of the alarm switches, a predetermined response is effected by the switching control unit 14 in accordance with configuration data in an alarm table that is stored in the memory of the switching control unit 14. For example, one entry in the alarm table instructs the switching control unit 14 to cause the switching unit 17 to display, on a selected monitor, the image from a specified camera in response to the activation of a corresponding alarm switch. Another alarm table entry instructs the switching control unit 14 to cause the switching unit 17 to maintain a specified image upon a specified monitor for a selected period of time, or until the user at a selected keyboard acknowledges that an alarm event has occurred.

Additional configuration data stored in the memory of the switching control unit 14, includes a time-event table whereby the switching control unit 14 is instructed to operate in accordance with particular configuration data at specified times of the day, days of the week, or similar cyclic intervals. For example, it may be desirable to operate the switching control unit 14 in accordance with a first configuration during daytime business hours, and in accordance with a second configuration during other periods of time. In such an arrangement, a first alarm table for use during the daytime causes the switching control unit 14 to ignore an alarm switch located at an entryway, while at night, a second alarm table would cause the switching control unit 14 to respond to activity at the entryway by causing the switching unit 17 to select an appropriate video input signal for display upon a selected monitor. The time-event table is used by the switching control unit 14 to select alarm tables or sequence parameters for use at specified times. Additionally, the time-event table can be used to effect the execution of other specified functions at specified times defined within the time-event table.

As can be appreciated, the switching control unit 14 is highly configurable in that many aspects of its operation are selected and/or altered by the operator during operation of the surveillance system 10. In a complex installation utilizing a large quantity of customized configuration data, the selection or alteration of such data by the user via the keyboard 18 is cumbersome and time-consuming. In such a system, it is preferable to provide a computer 26 that is programmed to allow the user to specify, edit, and/or store the configuration data. The computer 26 can be programmed to allow the user to specify and/or edit the desired configuration data "offline", i.e., in a manner that does not immediately affect the operation of the switching control unit 14. A bi-directional data link 28 connects the computer 26 to the COM1 terminal of the switching control unit 14 so that configuration data can be downloaded from the computer to the switching control unit 14. Additionally, configuration data can be uploaded from the switching control unit 14 to the computer 26 for editing.

During operation of the surveillance system 10, communication is maintained between the computer 26 and the switching control unit 14 so that an operator stationed at the computer 26 can obtain such information as the status of any alarms, the identity of users logged on to any of the keyboards, the sequences being displayed upon the monitors, and the like. In the preferred embodiment, the computer 26 operates under the ALLEGIANT Master Control Software, published by Burle Industries, Inc. of Lancaster, Pa.

Uninterrupted operation of the surveillance system 10 depends entirely upon uninterrupted operation of the switching control unit 14. The failure of any single peripheral component of the surveillance system 10, such as a camera, although potentially inconvenient, would not be catastrophic. In a secure installation, sufficient redundancy can be provided so that security is not compromised by the failure of any single component of the surveillance system 10 of FIG. 1. However, the exception to that rule is the switching control unit 14.

It would be desirable and is accordingly an object of the present invention to substantially eliminate the possibility of a single-point failure of the switching control unit 14, by providing a backup switching control unit that would assume the functions of the main switching control unit in the event of failure of the main unit. Because the switching control unit 14 contains and utilizes a considerable quantity of customized configuration data which can be altered during operation of the system, it is especially desirable and is accordingly an object of the present invention to continuously update the configuration of the backup switching control unit so that, in the event of failure of the main switching control unit, the backup unit can assume all of the functions of the main unit at any time.

Figure 2:
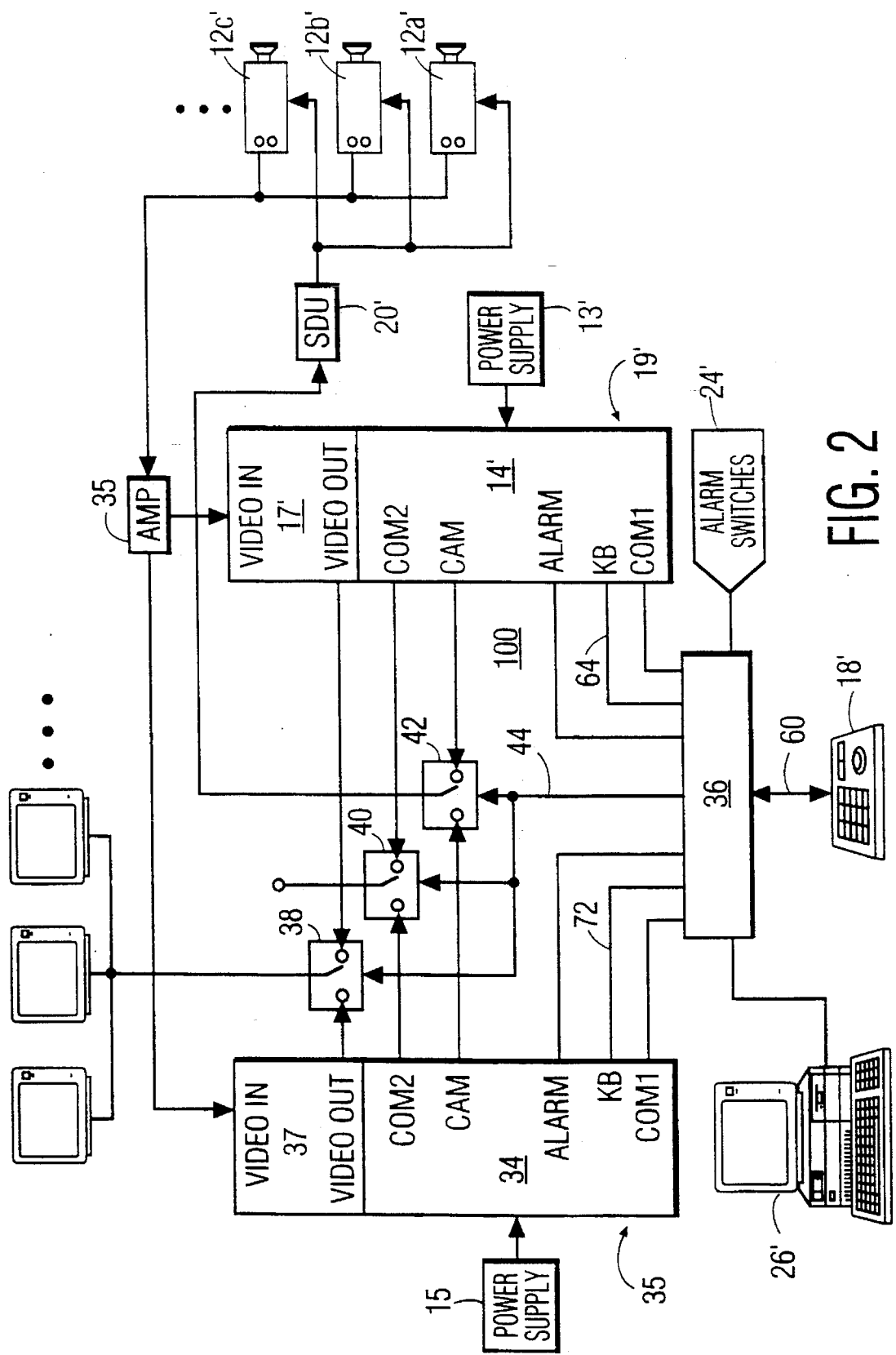
FIG. 2 is a diagram of a video security system in accordance with the present invention.

Referring now to FIG. 2, there is shown a preferred embodiment of a video security system 100 according to the present invention. The video security system 100 has a main switching control unit 14' and a backup switching control unit 34.

The main switching control unit 14' is operationally connected with a main switching unit 17' both of which are mounted within an enclosure 19'. During normal operation of the security system 100, the main switching unit 17' receives video signals at its VIDEO IN terminal, and supplies video output signals to the monitors 16*a*', 16*b*', and 16*c*' in response to switching control signals from the main switching control unit 14' in accordance with configuration data stored in the memory of the main switching control unit 14'.

Operating in tandem with the main switching control unit 14' is a backup switching control unit 34. The backup switching control unit 34 is substantially identical in function and programming to the main switching control unit 14'. The backup switching control unit 34 is operatively connected therein with a backup switching unit 37, both of which are preferably housed within an enclosure 35.

The main switching control unit 14' is supplied with electrical power from power supply 13'. The backup switching control unit 34 is supplied with electrical power from a separate power supply 15 that is preferably independent of power supply 13'. During normal operation of the security system 100, the backup switching control unit 34 and its associated switching unit 37 receive the same inputs as the main switching control unit 14' and its associated switching unit 17'. However, the backup units are not connected to certain components of the security system 100 as described more fully hereinbelow.

The security system 100 has a backup control system including transfer relays 38, 40, and 42 and a backup controller 36. The relay 38 is connected between the VIDEO OUT terminals of the main and backup switching units and normally connects the main switching unit 17' with the monitors 16a'–16c'. The relay 40 is connected between the COM2 ports of the main and backup units and normally connects the main switching control unit 14' with an external status monitoring device (not shown). The relay 42 is connected between the CAM ports of the main and backup units and normally connects the main switching control unit with the camera control signal distribution unit 20'.

The backup controller 36 is adapted to detect a malfunction of the main switching control unit 14' and to then effect transfer of control of the security system 100 to the backup switching control unit 34 by effecting operation of the transfer relays 38, 40, and 42. When a failure of the main switching control unit 14' is detected by the backup controller 36, the backup controller 36 provides a transfer control signal, along signal line 44 to the relays 38, 40, and 42, so that the relays operate to connect the COM2, and CAM terminals of the backup switching control unit 34, and to connect the VIDEO OUT terminals of the backup switching unit, with the appropriate peripheral devices.

As can be appreciated, the backup switching control unit 34 need not be connected to certain peripheral equipment, such as the cameras 12a'–c', during normal operation because the lack of connection to such devices does not present a risk of losing consistency between the configuration data stored in the memory of the backup switching control unit 34 and that stored in the main switching control unit 14'. Other peripheral devices, such as the keyboard 18', are used during normal operation to alter configuration data within the main switching control unit 14'. Thus, the control signals that are transmitted from such configuration-altering peripheral devices should be provided to the backup switching control unit 34 in tandem with the transmission of those control signals to the main switching control unit 14'.

In a preferred embodiment, the keyboard 18' is connected via bi-directional link 60, to the backup controller 36. Control signals transmitted from the keyboard 18' are duplicated by the backup controller 36 and transmitted to the keyboard terminal KB of the main switching control unit 14' along bi-directional link 64. The backup controller 36 replicates the keyboard control signals and provides the replicated control signals to the keyboard terminal KB of backup switching control unit 34 via link 72.

During normal operation of the main switching control unit 14', any signals that are transmitted from the keyboard terminal KB of the main switching unit 14' along link 64 are routed through the backup controller 36 to keyboard 18' via link 60. However, any signals that are transmitted from the keyboard terminal KB of the backup switching control unit 34 along link 72 are not routed to the keyboard 18' via link 60. Instead, the backup controller provides termination of the data transmission lines of link 72 in the direction from the keyboard terminal KB of backup switching control unit 34, so that the backup switching control unit 34 behaves as if a keyboard were directly connected to its keyboard terminal. In other words, the backup controller 36 maintains two-way communication between the main switching control unit 14' and the keyboard 18', but only one-way communication (i.e., from the keyboard 18' to the backup switching control unit 34) is provided between the keyboard 18' and the backup switching control unit 34. When the backup controller 36 detects a failure of main switching control unit 14', the backup controller 36 severs the two-way connection between the keyboard 18' and the main switching control unit 14'. The backup controller 36 then establishes two-way communication between the keyboard 18' and the backup switching control unit 34.

Concurrent with the establishment of two-way communication between the keyboard 18' and the backup switching control unit 34, the backup controller transmits the transfer control signal over signal line 44 to the relays 38, 40, and 42 to effect connection of the backup switching control unit 34 and its associated switching unit 37 with other peripheral equipment in the security system 100. In the preferred embodiment, the relays 38, 40, and 42 and the other switching mechanisms of the backup controller 36 are of a type that maintain the most-recently established connection status in the event that the backup controller 36, and hence the signal line 44, undergoes a loss of power. Thus, the backup controller 36 does not itself introduce any significant additional failure mechanisms. Additionally, it is noted that certain connections within the security system 100, such as the connections to the monitors 16a'–16c', are depicted in FIG. 2 as single lines, but are preferably embodied as multi-conductor lines. Hence, the relay associated with such multiple conductor signal lines includes multiple, parallel switching devices.

In an embodiment where the switching units are programmed to detect any loss of an input video signal, it is preferable to provide a signal distribution amplifier 35, so that the video signals from the cameras 12a'–c' are connected in parallel to the VIDEO IN ports of both the main switching unit 17' and the backup switching unit 34.

Figure 3:
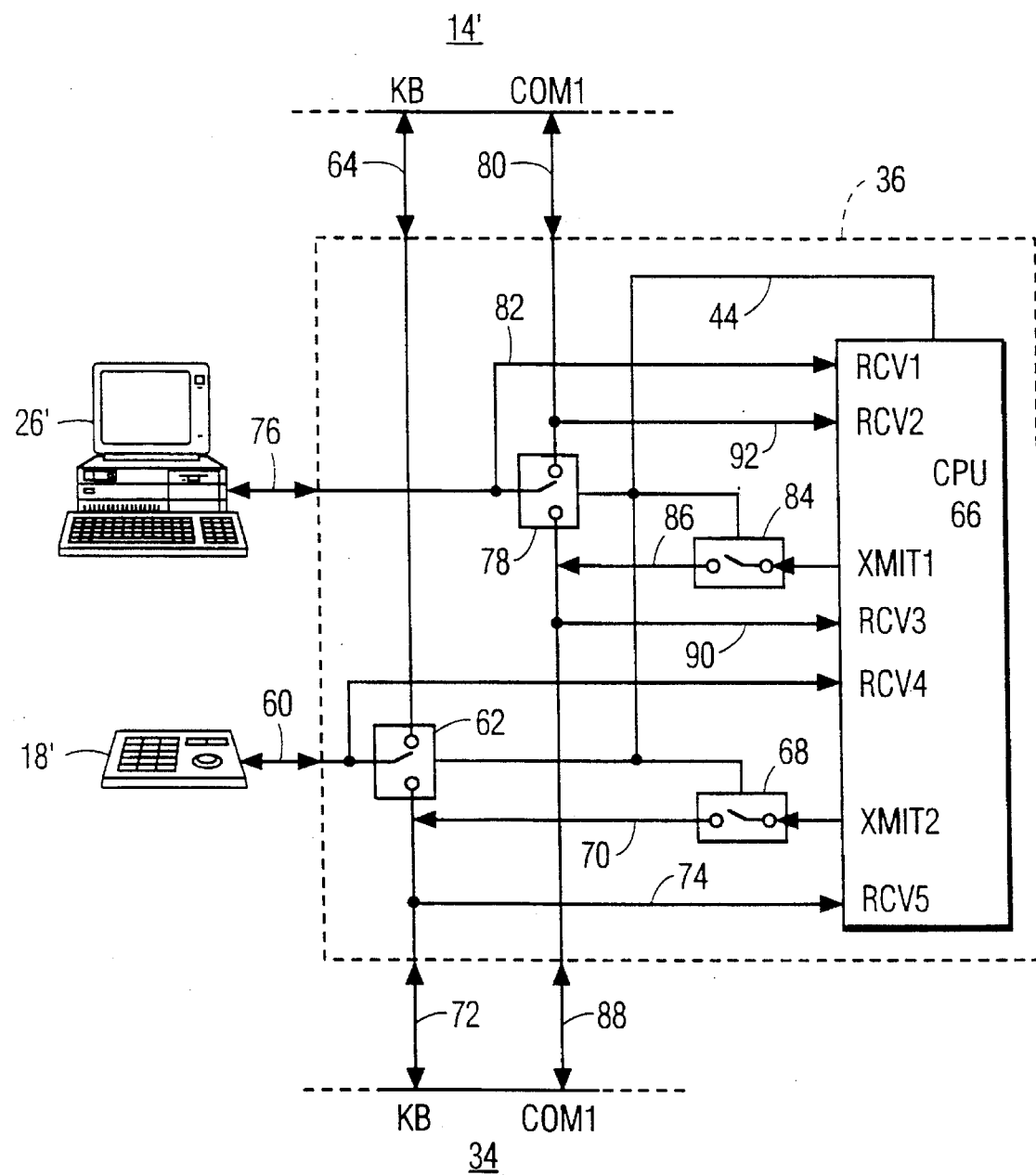
FIG. 3 is a partial schematic of the interconnections of peripheral equipment, the main video switching unit, and the backup video switching unit to and through the backup controller of the video security system shown in FIG. 2.

Referring now to FIG. 3 there is shown in greater detail a preferred arrangement for the backup controller 36. The keyboard 18' is connected to the backup controller 36 through a bi-directional link 60. Each of the individual lines of bi-directional link 60 are connected through a relay 62, one contact of which is connected to the terminal KB of main switching control unit 14' through bi-directional link 64 and the other contact of which is connected to the terminal KB of backup switching control unit 34. Along link 60, the signal lines which transmit data in the direction from the keyboard 18' to the backup controller 36 are tapped ahead of rely 62 to provide a link to a data reception port, RCV4, of a central processing unit (CPU) 66. During normal operation, the CPU 66 monitors all data transmissions from the keyboard 18' to the main switching control unit 14'.

During normal operation, the CPU 66 re-transmits from data transmission port XMIT2 all of the data that are received at port RCV4. The re-transmitted data signals pass through relay 68 to signal link 70 which is tapped into the signal lines of bi-directional link 72 that transmit data toward the keyboard terminal KB of the backup switching control unit 34. The signal lines within bi-directional link 72 that carry data signals in the direction away from the keyboard terminal KB of switching control unit 34 are tapped by signal line 74 to provide those data signals to reception port RCV5 of CPU 66. With such a configuration, the keyboard terminal KB of backup switching control unit 34 is maintained in bi-directional communication with CPU 66 and is provided with all of the data signals from the keyboard 18'.

As discussed in connection with FIG. 2, the backup controller 36 transmits a transfer control signal on signal line 44 to effect actuation of relays 38, 40, and 42 when the backup controller 36 detects a failure of the main switching control unit 14'. That transfer control signal is generated by CPU 66. The transfer control signal on line 44 is received by relay 62, which is thereby actuated to connect bi-directional link 60 with bi-directional link 72. Signal line 44 is connected to relay 68 so that in response to the transfer control signal, relay 68 is actuated to open the connection between port XMIT2 and signal line 70. Thus, when a failure of the main switching control unit 14' is detected, the I/O port of keyboard 18' is automatically connected directly to the keyboard terminal KB of the backup switching control unit 34.

The backup controller 36 monitors the operation of the main switching control unit 14' in order to detect a failure condition. In the preferred embodiment, the failure detection function of the backup controller 36 is performed as part of the process for maintaining consistency of configuration data within the main and backup switching control units. For example, in addition to monitoring and duplicating communications from the computer 26' to the main switching control unit 14', the backup controller also monitors the responses of the main switching control unit 14' to such communications from the computer 26'. An error in, or absence of, such a response is indicative of a failure that requires transfer to the backup switching control unit 34 to be effected.

In order to alert a user to a potentially important event, the surveillance system 100 (FIG. 2) includes a plurality of alarm switches 24' that are connected to an input terminal of the backup controller 36. Whenever the backup controller 36 detects activation of one of the alarm switches, it transmits the alarm signal to the ALARM terminals of the main switching controller 14' and the backup switching controller 34. In a manner similar to that described in connection with FIG. 1, a predetermined response is effected by the main switching control unit 14' in accordance with configuration data in an alarm table that is stored in the memory of the switching control unit 14'. The alarm condition is also provided to the backup switching control unit 34 to provide redundancy in the event of a failure of the main switching control unit 14'.

Referring again to FIG. 3, the computer 26' is connected to the backup controller 36 by a bi-directional link 76. More specifically, the bi-directional link 76 is connected to a relay 78 within the backup controller 36. One contact of relay 78 is connected to the COM1 port of main switching control unit 14' through a bi-directional link 80, and the other contact of relay 78 is connected to the COM1 port of backup switching control unit 34 through bi-directional link 88. During normal operation, bi-directional communication is conducted between the main switching control unit 14' and the computer 26'. Along link 76, the data signal transmissions in the direction of communication from the computer 26' to the COM1 port of the main switching control unit 14' are tapped ahead of relay 78, via signal line 82, to provide those data signals to receive port RCV1 of CPU 66. The CPU 66 duplicates the data signals received at port RCV1 and then transmits the duplicated signals via port XMIT1. Port XMIT1 is connected through a relay 84 to signal line 86, which is tapped into the signal lines of link 88 that carry data signals toward the COM1 port of the backup switching control unit 34. In that manner, all data transmissions from the computer 26' to the main switching control unit 14' are duplicated and provided to the backup switching control unit 34.

The signal lines of link 88 that carry data signals from the COM1 port of the backup switching control unit 34 are tapped via signal line 90 to provide the data signals on those lines to receive port RCV3 of CPU 66. In that manner CPU 66 maintains, via ports XMIT1 and RCV3, bi-directional communication with the COM1 port of backup switching control unit 34.

In order to detect failure of the main switching control unit 14' several methods can be used. In one method of failure detection, the main switching control unit 14' is pre-programmed to periodically transmit status information, in a predetermined coded signal, on communication link 80. The CPU 66 monitors the periodic status transmissions and determines whether the status information is incorrect, absent, or otherwise indicative of a malfunction.

In another method of failure detection, data signals that are transmitted on communication link from the COM1 port of the main switching control unit 14' are tapped via signal line 92 and provided to receive port RCV2 of the CPU 66. In the preferred embodiment, the computer 26' is programmed to periodically transmit signals along link 76 to the COM1 port of main switching control unit 14' which is programmed to acknowledge those signals. The backup switching control unit 34 is programmed similarly. The switching control units are programmed to transmit respective acknowledgment signals upon receipt of any communication at their respective COM1 ports. The CPU 66 is programmed to identify transmissions from the computer 26' which require an acknowledgment from the main switching control unit 14'. Whenever such a communication is received at the RCV1 port of CPU 66, CPU 66 then monitors port RCV2 in order to verify that the requisite acknowledgment signal is transmitted by the main switching control unit 14'. If the CPU 66 detects that the main switching control unit does not respond with the proper acknowledgment signal, then the CPU 66 generates and transmits the transfer control signal along signal line 44, to effect transfer of video operations to the backup switching control unit 34 and its associated switching unit 37.

The transfer control signal is input to relay 78 and to relay 84 in order to establish bi-directional communication between the computer 26' and the COM1 port of the backup switching control unit 34 and to simultaneously open the connection between the XMIT1 port of CPU 66 and the COM1 port of the backup switching control unit 34. When the transfer control signal is transmitted, the appropriate peripheral equipment of the security system 100 is connected to the respective switching unit 37 and backup switching control unit 34. Backup switching control unit 34 then continues to operate in accordance with the same configuration data as the main switching control-unit 14' prior to the failure condition. Additionally, the backup switching control unit 34 is then operating in accordance with the predetermined response to any alarm conditions existing at the time control is transferred thereto.

Figure 4:
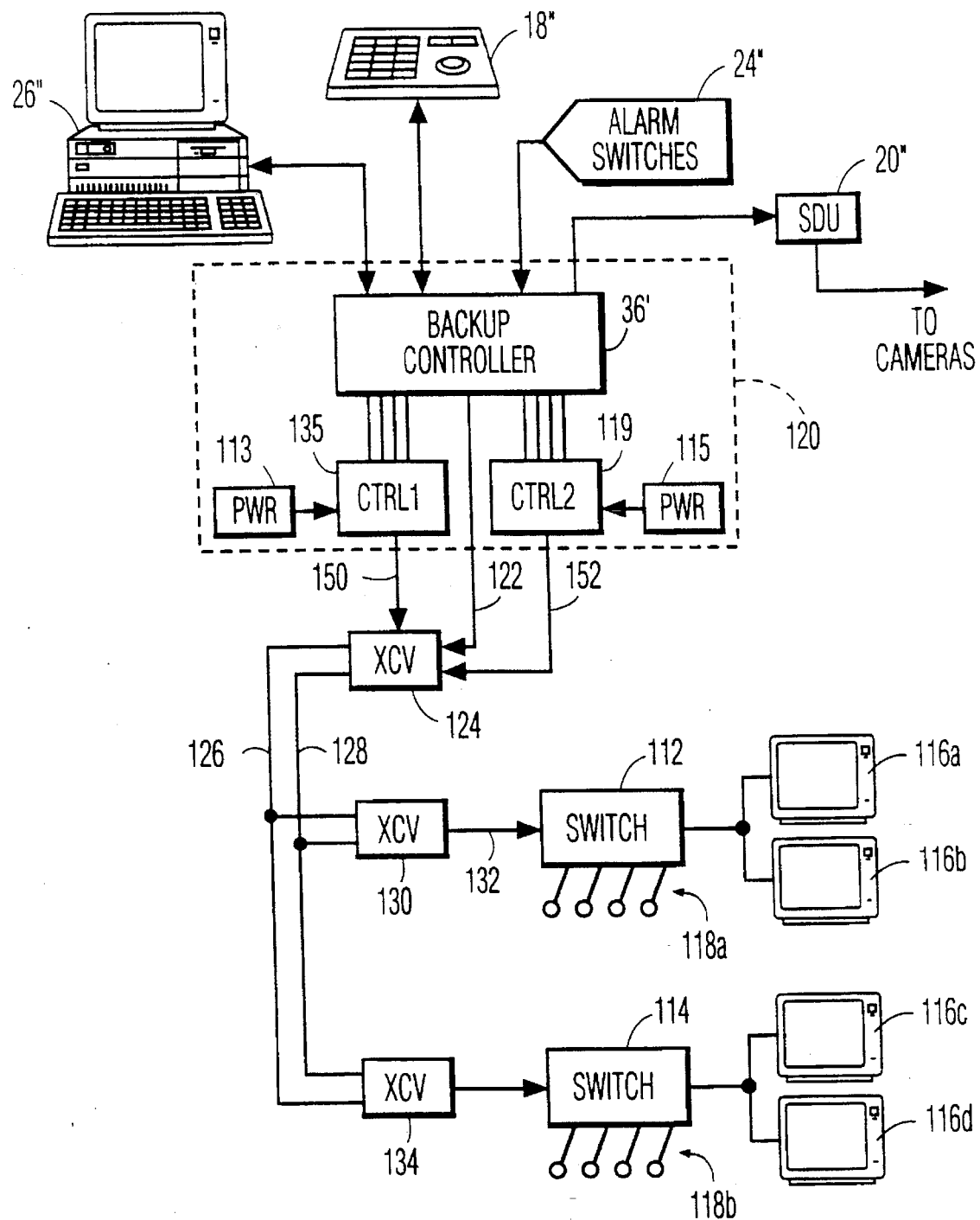
FIG. 4 is a diagram of a video security system in accordance with an alternative embodiment of the present invention.

In accordance with the present invention, a backup controller is arranged to transfer both the control and switching functions of the video security system to a backup switching control unit and an associated switching unit. In an alternate embodiment, a selected subset of functions may be so transferred to either a backup switching control unit or a backup switching unit. There is shown in FIG. 4 a distributed, or "satellite" video security system wherein the main switching control unit 135 is located remotely from one or more satellite switching units, such as switching unit 112 and switching unit 114. Such an arrangement is preferred for applications wherein it is desirable to have several operators to staff a plurality of monitor banks. For example, one operator may be assigned to observe monitors 116a–b, which are connected to receive video signals from switching unit 112, while another operator may be assigned to observe monitors 116c–d, which are connected to receive video signals from switching unit 114.

The main switching control unit 135 is housed within an enclosure 120, such as a "card cage" having a suitable back plane (not shown) for providing interconnections among the main switching control unit 135, a backup controller 36', and a backup switching controller 119. Within the enclosure 120, the main unit 135 and the backup unit 119 are connected with separate respective power supplies 113 and 115. The power supplies 113 and 115 are preferably uninterruptible power supplies that are externally fed by separate power circuits (not shown).

The interconnections among the components within enclosure 120 are similar to the interconnections described hereinabove in connection with the embodiment shown in FIGS. 2 and 3. External connections are made from the backup controller 36' to a configuration selection computer 26", a keyboard 18", a plurality of alarm switches 24", and a signal distribution unit 20" for providing control signals to a plurality of remote cameras (not shown). The switching control units 135 and 119 each provide a high-speed serial output 150 and 152, respectively. The serial outputs 150 and 152 are connected with a fault-tolerant data transceiver 124. The backup controller 36' includes an output 122 that controls the transceiver 124 selection of input between high-speed serial outputs 150 and 152. In a preferred embodiment, the high-speed serial outputs 150 and 152 are of the Ethernet 10BASE-T type and the transceiver 124 is an on-line, fault-tolerant, 10BASE-T transceiver of the type manufactured by Chipcom, Inc. of Sunnyvale, Calif.

The transceiver 124 receives data signals from output 150 or 152 and reproduces the received data signal as selected by output 122 upon redundant data communication lines 126 and 128. The data communication lines 126 and 128 are connected, preferably via different routes, to a transceiver 130, which is at a first remote location. The transceiver 130 receives data signals communicated upon lines 126 and 128, and provides such data signals as a single input, via signal line 132, to switching unit 112. The switching unit 112 receives the data signals from line 132, responds by selectively connecting video signals from among a plurality of video input lines 118a to the monitors 116a–b. Similarly, a transceiver 134 is operatively connected to the switching unit 114 for receiving the redundant data signals from lines 126 and 128 and for providing such data as a single input to switching unit 114. The switching unit 114, in response, selectively provides connections between video input terminals 118b and monitors 116c–d.

The backup controller 36' is operative to monitor communications that are transmitted and/or received by the main switching control unit 135 and to detect a failure condition based on the monitored communications. When a failure of switching control unit 135 is detected by the backup controller 36', then the backup controller generates a transfer control signal and transfers control of the remote switching units to the backup switching control unit 119 as in the manner described hereinabove. Hence, in the security system of FIG. 4, the switching units 112 and 114 continue to provide selective connections of video signals to monitors 116a–d while the switching control function is transferable between control unit 135 and control unit 119.

From the foregoing disclosure and the accompanying drawings it can be seen that the present invention provides certain novel and useful features that will be apparent to those skilled in the pertinent art. In particular, there has been described a video security system wherein a backup matrix switching unit is maintained in operation in tandem with a main switching unit, and wherein the backup matrix switching unit is maintained in operation while disconnected from peripheral equipment of the security system which operate under its control. A backup controller has been described which duplicates data transmissions from selected peripheral equipment to the main switching unit, and provides the duplicated data to the backup switching unit. Thus, identical configuration data is maintained in the two switching units, and backup capability is provided that does not rely upon any specialized backup functions of either of the switching units.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

That which is claimed is:

1. A video security system, comprising:

a video monitor connected to receive a monitor video signal and for displaying a video image represented by the monitor video signal;

a plurality of cameras each disposed at a location remote from said video monitor for producing a camera video signal representing an image of the respective remote location;

a first switching control unit for receiving configuration data and for generating first switching control signals in accordance with the configuration data;

a second switching control unit for receiving configuration data and for generating second switching control signals in accordance with the configuration data;

a video switching unit connected for receiving the camera video signal from each of said plurality of cameras, for receiving the first switching control signals, and for providing the monitor video signal to said video monitor from among the camera video signals in accordance with the received switching control signals;

configuration selection means for generating the configuration data, said configuration selection means being connected for transmitting the configuration data to said first switching control unit;

a backup controller connected with said configuration selection means for monitoring the configuration data transmitted to said first switching control unit and providing a duplicate of the configuration data to said second switching control unit in tandem with the transmission of the configuration data to said first switching control unit, said backup controller further comprises detection means for detecting a failure condition of said first switching control unit and for generating a transfer control signal in response thereto; and transfer means responsive to the transfer control signal for disconnecting said configuration selection means from said first switching control unit and connecting said configuration selection means to said second switching control unit, wherein said video switching unit further for receiving the second switching control signals generated by said second switching control unit upon the detection of a failure condition by said backup controller.

2. The security system of claim 1, wherein said video switching unit comprises a first video switching unit for receiving the first switching control signals;

said security system further comprising:

a second video switching unit connected for receiving the camera video signals from each of said plurality of cameras, and for receiving the second switching control signals, said second video switching unit being adapted for providing the monitor video signal from among the camera video signals in accordance with the second switching control signals; and still further wherein said transfer means is responsive to the transfer control signal for disconnecting said first video switching unit from said video monitor and for connecting said second video switching unit with said video monitor for providing the video monitor signal thereto.

3. The security system of claim 1, further comprising a power source operatively connected for providing electrical power to said backup controller and said transfer means, and wherein said transfer means further comprises switching means adapted for maintaining a connection state among said configuration selection means, said first switching control unit, and said second switching control unit in the event of a failure of said power source.

4. The security system of claim 1, further wherein said first switching control unit is programmed for acknowledging receipt of the configuration data from said configuration selection means, and wherein said detection means is further adapted for detecting a failure of said first switching control unit to acknowledge receipt of the configuration data transmitted from said configuration selection means.

5. The security system of claim 4, still further wherein said first switching control unit is further programmed to transmit a status indicating signal, and said detection means is further configured to detect an error in the status indicating signal or an absence of the status indicating signal.

6. The security system of claim 1, further wherein said configuration selection means comprises a general purpose computer.

7. The security system of claim 1, further wherein said configuration selection means comprises a control console having a keyboard.

8. The security system of claim 1, further comprising an alarm switch connected for providing an alarm signal to said backup controller, said backup controller further being adapted for transmitting the alarm signal to corresponding alarm inputs of said first switching control unit and said second switching control unit.

9. The security system of claim 1, further comprising a signal distribution unit for providing camera control signals to said plurality of cameras for operating said cameras, and wherein the configuration data contains the camera control signals and said backup controller is further adapted for transmitting the camera control signals to said signal distribution unit.

10. The security system of claim 1, wherein said backup controller further comprises a switch having a pole connected to a data output port of said first switching control unit, a second pole connected to a data output port of said second switching control unit, and an output terminal, the switch being responsive to the transfer control signal for disconnecting the output terminal from the first pole and connecting the output terminal to the second pole.

11. A video security system, comprising:

a video monitor connected to receive a monitor video signal and for displaying a video image represented by the monitor video signal;

a plurality of cameras each disposed at a location remote from said video monitor for producing a camera video signal representing an image of the respective remote location;

a first switching control unit for receiving configuration data and for generating first switching control signals in accordance with the configuration data;

a second switching control unit for receiving configuration data and for generating second switching control signals in accordance with the configuration data;

a first video switching unit connected to said first switching control unit for receiving the first switching control signals, and operatively connected for receiving the camera video signal from each of said plurality of cameras and for providing the monitor video signal to said video monitor from among the camera video signals in accordance with the first switching control signals;

a second video switching unit connected to said second switching control unit for receiving the second switching control signals, and operatively connected for receiving the camera video signals from each of said plurality of cameras, said second video switching unit being adapted for providing the monitor video signal from among the camera video signals in accordance with the second switching control signals;

configuration selection means for generating the configuration data, said configuration selection means being connected for transmitting the configuration data to said first switching control unit;

a backup controller connected with said configuration selection means for monitoring the configuration data transmitted to said first switching control unit and providing a duplicate of the configuration data to said second switching control unit in tandem with the transmission of the configuration data to said first switching control unit, said backup controller further comprises detection means for detecting a failure condition of said first switching control unit and for activating a transfer control signal in response thereto; and transfer means responsive to said transfer control signal for (i) disconnecting said configuration selection means from said first switching control unit and connecting said configuration selection means to said second video switching control unit and (ii) disconnecting said first video switching unit from said monitor and connecting said second video switching unit to said monitor.

12. The security system of claim 11, further comprising a power source operatively connected for providing electrical power to said backup controller and said transfer means, and wherein said transfer means further comprises switching means adapted for maintaining a connection state among said configuration selection means, said first switching control unit, and said second switching control unit in the event of a failure of said power source.

13. The security system of claim 11, wherein said first switching control unit is programmed for acknowledging receipt of the configuration data from said configuration selection means, and wherein said detection means is further adapted for detecting a failure of said first switching control unit to acknowledge receipt of the configuration data transmitted from said configuration selection means.

14. The security system of claim 13, wherein said first switching control unit is further programmed to transmit a status indicating signal, and said detection means is further configured to detect an error in the status indicating signal or an absence of the status indicating signal.

15. The security system of claim 11, further wherein said configuration selection means comprises a general purpose computer.

16. The security system of claim 11, further wherein said configuration selection means comprises a control console having a keyboard.

17. The security system of claim 11, further comprising an alarm switch connected for providing an alarm signal to said backup controller, said backup controller further being adapted for transmitting the alarm signal to corresponding alarm inputs of said first switching control unit and said second switching control unit.

18. The security system of claim 11, further comprising a signal distribution unit for providing camera control signals to said plurality of cameras for operating said cameras, and wherein the configuration data contains the camera control signals and said backup controller is further adapted for transmitting the camera control signals to said signal distribution unit.

19. The security system of claim 11, wherein said backup controller further comprises a switch having a first pole connected to a data output port of said first switching control unit, a second pole connected to a data output port of said second switching control unit, and an output terminal, the switch being responsive to the transfer control signal for disconnecting the output terminal from said first pole and connecting the output terminal to said second pole.

20. A video security system, comprising:

a video monitor connected to receive a monitor video signal and for displaying a video image represented by the monitor video signal;

a plurality of cameras each disposed at a location remote from said video monitor for producing a camera video signal representing an image of the respective remote location;

a first switching control unit for receiving configuration data and for generating first switching control signals in accordance with the configuration data;

a second switching control unit for receiving configuration data and for generating second switching control signals in accordance with the configuration data;

a first video switching unit connected to said first switching control unit for receiving the first switching control signals, and operatively connected for receiving the camera video signal from each of said plurality of cameras and for providing the monitor video signal to said video monitor from among the camera video signals in accordance with the first switching control signals;

a second video switching unit connected to said second switching control unit for receiving the second switching control signals, and operatively connected for receiving the camera video signals from each of said plurality of cameras, said second video switching unit being adapted for providing the monitor video signal from among the camera video signals in accordance with the second switching control signals;

configuration selection means for generating the configuration data, said configuration selection means being connected for transmitting the configuration data to a first input of said first switching control unit, said configuration selection means further for allowing a system user to specify a desired configuration in a manner which does not immediately affect an operation of said first switching control unit, the desired configuration corresponding to configuration data to be transmitted to the first input of said first switching control unit, said configuration selection means further being responsive to a system user command for initiating the transmission of the configuration data to said first switching control unit;

configuration-altering means for altering the configuration data during a real-time operation of said security system, said configuration-altering means being connected for transmitting the configuration data to a second input of said first switching control unit, wherein the configuration data includes configuration data as altered by said configuration-altering means;

a backup controller connected with said configuration selection means and said configuration-altering means for monitoring the configuration data transmitted to said first switching control unit and providing a duplicate of the configuration data to a first input and a second input of said second switching control unit, respectively, in tandem with the transmission of configuration data to the first input and the second input of said first switching control unit, respectively, wherein the configuration data received by said second switching control unit is continuously maintained consistent with the configuration data in the first switching control unit, said backup controller further comprises detection means for detecting a failure condition of said first switching control unit and for activating a transfer control signal in response thereto; and transfer means responsive to said transfer control signal for (i) automatically disconnecting said configuration selection means and said configuration-altering means from said first switching control unit and connecting said configuration selection means and said configuration-altering means to said second video switching control unit and (ii) automatically disconnecting said first video switching unit from said monitor and connecting said second video switching unit to said monitor.

* * * * *